Feb. 28, 1928.
J. R. GALES
1,660,993
EYE PROTECTOR FOR VEHICLE DRIVERS
Filed March 18, 1926
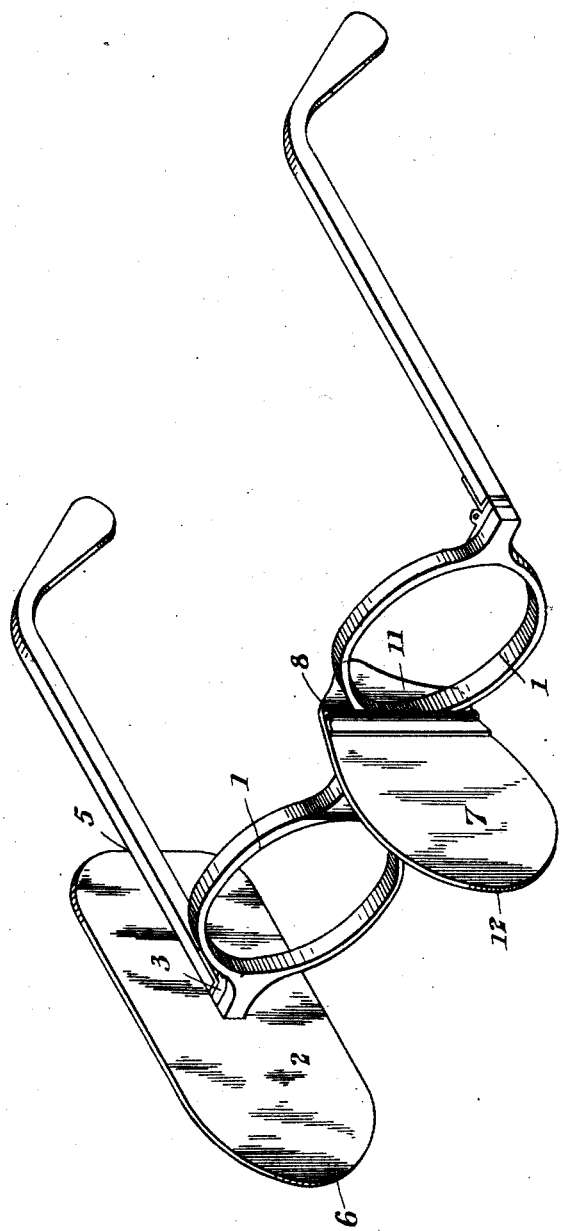
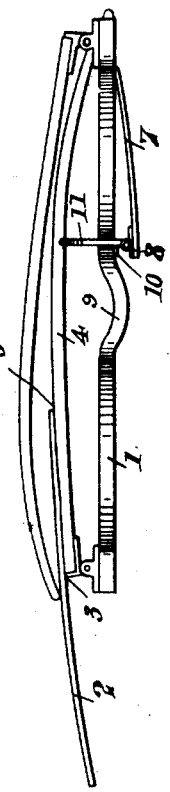
INVENTOR
JOHN RUSSELL GALES
BY HIS ATTORNEYS
Howson and Howson Patented Feb. 28, 1928.

1,660,993

UNITED STATES PATENT OFFICE.

JOHN RUSSELL GALES, OF READING, ENGLAND.

EYE PROTECTOR FOR VEHICLE DRIVERS.

Application filed March 18, 1926, Serial No. 95,706, and in Great Britain December 10, 1925.

The object of my invention is to provide convenient, efficient and simple means for protecting the eyes from dazzling light, the said means being adapted to be folded when not in use and is more especially intended for the drivers of motor road vehicles whether cars or cycles, but the invention is not limited thereto. I will presume, for the purposes of description, that the said means are to be used by the driver of a motor vehicle and that the rule of the road is as in the British Isles.

It has been proposed to provide a device for the purpose stated comprising a top mask and two lateral flaps one for each eye which may be opaque and which flaps are arranged obliquely in front of the eyes, whilst allowing a clear view of the road in front, such device being pivotally mounted to be moved up in front of the wearer's forehead out of use or moved down about a pivot when required for use, and it has also been proposed to combine with a spectacle frame one or more vertical screens so attached across a part of the lens carrier as to lie close to the pupils of the eyes.

According to my invention I provide a shield, or shields, carried, by any suitable means, upon the head of the driver, and so arranged and applied, that it, or they, will constitute no impediment to the driver's sufficient view of the road normally and, when a vehicle approaches with strong, or dazzing, head-lights, the driver can, by but a slight movement of his head, protect his eyes from the dazzling light of the approaching vehicle and still have sufficient view of the road to enable him properly to drive and direct his vehicle without necessitating any use of his hands for adjusting the said means.

The following is a convenient construction of means in accordance with my invention, but I do not limit myself to the precise details hereinafter described.

Upon a wire, or other suitable, frame adapted to be carried upon the head of the wearer, preferably by means which pass over the ears, I carry, attach, or form, means, such, for instance, as socket-pieces, to which shields are secured, for instance by stems passed into the sockets, these stems and sockets, or their equivalents, being adapted to support the shields in proper angular position, the one shield to be held close to the right temple of a vehicle driver and to project to a sufficient distance beyond the right eye and the left shield to project from the nose, or near the nose, to a sufficient distance beyond the left eye, the angle of the projecting parts of the shields and their extent of projection being such that by a slight movement of the head towards his left, the eyes of the driver will be protected from the rays of dazzling lights approaching him on his right, whilst his ahead view will not be impeded, or only be impeded to so small an extent as not to interfere with his view of the road for proper driving, suitable means are provided for example a hinge or hinges with or without springs for allowing the shields to be folded when not in use. For example, the right-hand shield can be secured to the right-hand arm of a spectacle-frame or other support, and the left-hand shield be hinged to the bridge-piece of the spectacle-frame, or other support, so that the whole device can be folded down onto the frame, in a compact form.

I have shewn in the accompanying drawing a device according to my invention provided with two shields as aforesaid which when not in use are adapted to be folded up and inserted in a case, Figure 1 shewing the said device in perspective with the parts in the open position one shield extending forwardly and rearwardly of the frame and Figure 2 shewing the said device in plan with its parts in their closed or folded position.

A spectacle frame 1 is made of any suitable material but preferably of horn or tortoise shell or equivalent light material having a horizontally elongated shield 2 for protecting the right eye, formed of a suitable translucent, semi-transparent or opaque material secured rearwardly at 3 to the right hand side-arm 4 of the spectacle frame extending forwardly and rearwardly of the frame beyond the frame end; the said shield is of a suitable width and length to protect the right eye when in use from rays from the right hand side penetrating forwardly and rearwardly and for this purpose the said shield is continued sufficiently far back on the arm of the frame as shewn at 5; the forward edges may be straight whereby a clearer demarcation between light and shade is obtained, or for convenience when folded the shield may be curved at its forward edges as shewn at 6 in Figure 1. A left eye shield 7 is mounted on a spring hinge 8 secured to the spectacle frame at 10 adjacent to the left-hand side of the bridge piece 9 of the said frame, so as to block out rays of light coming from the right. The said shield 7 is sufficiently extended forwardly to block out the rays of light coming from the same direction and may be made with straight edges at its front part or it may be curved as indicated at 12. When not in use the arms of the frame of the device are closed like a pair of spectacles whereby the right shield 2 is brought back to lie against and behind the main frame while the left shield 7 is pressed back to lie against the front of the left eye frame, when it can be inserted in a case.

The shield 7 projecting from, or near the nose, may be provided with a rear part 11, adapted to sit close against the side of the nose and prevent the entrance of dazzling rays between the edge of the shield and the face of the wearer and this, when the said shield is hinged to the spectacle frame, or other support, may be arranged to hold the shield in position when the device is not in use.

The shields may be made of any suitable material whether transparent, or translucent, or semi-opaque, or even opaque which will sufficiently intercept or divert, the objectionable rays of light, but preferably they are made of a translucent, or semi-transparent, material whereby the wearer is caused to see the headlights of the approaching car or vehicle reduced in power or dimmed by reason of the semi-transparent shields, while he has a clear vision of the road in front through that portion of the field of vision not covered by the shields. The said shields are made of sufficient length forwardly so as to intercept the rays of dazzling light on a car approaching from the right while at the same time the rays of light from the front and left will not be obstructed and so the wearer will have a clear view ahead.

While I have described and illustrated my invention as constructed for use in the British Isles, where vehicles pass on the right, the shields may obviously be so placed as to protect the eyes in countries where it is customary to pass on the left.

What I claim is:—

1. Means for protecting the eyes from the dazzle of approaching lights comprising a frame adapted to be carried upon the head, in combination with shields hinged to said frame and foldable therewith, one shield extending forwardly and rearwardly of the frame beyond the frame end.

2. Means for protecting the eyes from the dazzle of approaching lights comprising a spectacle frame, socket-pieces, a bridge piece connecting said socket-pieces, and a pair of arms hinged to said socket-pieces, all forming part of said frame, in combination with two eye-shields, one of said shields extending forwardly and rearwardly of said frame, its forward part being foldable and hinged to said bridge piece and the other shield extending forwardly and rearwardly of the frame, being fastened to one of said arms, substantially as described.

In testimony whereof I have signed my name to this specification.

JOHN RUSSELL GALES.